(12) United States Patent
Magill et al.

(10) Patent No.: US 10,414,453 B2
(45) Date of Patent: Sep. 17, 2019

(54) SYSTEM AND METHOD FOR AIMING A VEHICULAR HEADLAMP

(71) Applicant: Ford Motor Company, Dearborn, MI (US)

(72) Inventors: Joshua Magill, Royal Oak, MI (US); Matt Roosen, Memphis, MI (US); Albert Ekladyous, Shelby Township, MI (US)

(73) Assignee: Ford Motor Company, Dearborn, MI (US)

( * ) Notice: Subject to any disclaimer, the term of this patent is extended or adjusted under 35 U.S.C. 154(b) by 72 days.

(21) Appl. No.: 15/878,528

(22) Filed: Jan. 24, 2018

(65) Prior Publication Data

US 2019/0225289 A1     Jul. 25, 2019

(51) Int. Cl.
| | | |
|---|---|---|
| *B60Q 1/06* | (2006.01) | |
| *B62D 65/00* | (2006.01) | |
| *G01B 11/06* | (2006.01) | |
| *B60Q 1/04* | (2006.01) | |

(52) U.S. Cl.
CPC ............. *B62D 65/005* (2013.01); *B60Q 1/04* (2013.01); *G01B 11/0608* (2013.01)

(58) Field of Classification Search
CPC ............................... B60Q 1/04; G01B 11/0608
See application file for complete search history.

(56) References Cited

U.S. PATENT DOCUMENTS

| | | | |
|---|---|---|---|
| 6,278,912 B1* | 8/2001 | Amano | ............ B60G 17/01908 |
| | | | 280/5.507 |
| 6,305,823 B1 | 10/2001 | Toda et al. | |
| 6,363,619 B1* | 4/2002 | Schirmer | ............... G01B 11/27 |
| | | | 33/288 |
| 6,450,673 B1 | 9/2002 | Toda et al. | |
| 6,572,248 B2 | 6/2003 | Okuchi et al. | |
| 7,241,034 B2 | 7/2007 | Smith et al. | |
| 7,313,870 B2 | 1/2008 | Jeon | |
| 8,206,016 B2 | 6/2012 | Todani et al. | |
| 8,422,004 B1* | 4/2013 | Ekladyous | ............ G01J 1/4214 |
| | | | 356/121 |
| 8,582,091 B2 | 11/2013 | Ekladyous et al. | |
| 9,114,754 B2 | 8/2015 | Ehlgen et al. | |
| 9,125,336 B2* | 9/2015 | Jeong | ..................... H05K 13/08 |

(Continued)

OTHER PUBLICATIONS

Glascott-Jones, A., MEMS for Tilt Measurement and Headlight Leveling, Sensors Online, Oct. 2008, available at URL http://www.sensorsmag.com/components/mems-for-tilt-measurement-and-headlight-leveling.

*Primary Examiner* — Ali Alavi
(74) *Attorney, Agent, or Firm* — Burris Law, PLLC (57) ABSTRACT

A headlamp aiming method for a vehicle includes measuring, by a height measurement instrument, at least two reference heights of at least two reference areas along a body of the vehicle. The height measurement instrument is positioned external of the vehicle, and one of the at least two reference heights is indicative of a height of a headlamp of the vehicle. The method further includes determining a vehicle pitch and a headlamp height variation of the vehicle based on the measured reference heights, calculating a modified headlamp position based on the vehicle pitch, the headlamp height variation, and a standard headlamp position, and aiming a headlamp of the vehicle based on the modified headlamp position.

20 Claims, 5 Drawing Sheets

(56) References Cited

U.S. PATENT DOCUMENTS

| | | | |
|---|---|---|---|
| 9,452,657 B1 | 9/2016 | Giaier et al. | |
| 10,054,433 B2* | 8/2018 | Shumate | G01M 11/061 |
| 2006/0291222 A1* | 12/2006 | Ando | B60Q 1/115 |
| | | | 362/466 |

* cited by examiner

SYSTEM AND METHOD FOR AIMING A VEHICULAR HEADLAMP

FIELD

The present invention relates to a system and method for aiming a headlamp on a vehicle.

BACKGROUND

The statements in this section merely provide background information related to the present disclosure and may not constitute prior art.

Typically, a vehicle includes at least two headlamps positioned along a front module of the vehicle for illuminating an area in front of the vehicle. During manufacturing, the vehicle undergoes an aim alignment process in which the position of the headlamp bulbs are adjusted to aim the light beam from the headlamps within a set range. Specifically, the light beam is aimed such that the beam is high enough (i.e., above ground) to illuminate the road ahead of the vehicle and low enough so as not to blind oncoming traffic.

In the aiming process, vehicles of a given make/model are aimed in the same manner. That is, each vehicle uses the same inputs for aiming the headlamps. However, manufacturing variations between vehicles can affect a ride height of the vehicle, thus affecting the height of the headlamps and therefore, the aim of the light beam. These and other issues are addressed by the present disclosure.

SUMMARY

This section provides a general summary of the disclosure, and is not a comprehensive disclosure of its full scope or all of its features.

In one form, the present disclosure is directed toward a headlamp aiming method for a vehicle. The method includes measuring, by a height measurement instrument, at least two reference heights of at least two reference areas along a body of the vehicle, where one of the at least two reference heights is indicative of a height of a headlamp of the vehicle. The method further includes: determining a vehicle pitch and a headlamp height variation of the vehicle based on the measured reference heights; calculating a modified headlamp position based on the vehicle pitch, the headlamp height variation, and a standard headlamp position; and aiming a headlamp of the vehicle based on the modified headlamp position. The height measurement instrument is disposed external of the vehicle.

In another form, the at least two reference heights include a front reference height and a rear reference height separated from the front reference height by a base distance.

In yet another form, the front reference height is taken at a front wheel fender and a rear reference height is taken at a rear wheel fender. The height of the front wheel fender is provided as a reference height indicative of the height of the headlamp of the vehicle.

In one form, the at least two reference heights include a front driver height, a front passenger height, a rear driver height, and a rear passenger height.

In another form, the determining the vehicle pitch further includes: calculating an average front vehicle height based on the front driver height and the front passenger height; and calculating an average rear vehicle height based on the rear driver height and the rear passenger height, where the pitch is determined based on the average front vehicle height and the average rear vehicle height.

In yet another form, the measuring of the at least two reference heights further includes capturing an image of the at least two reference areas by a dedicated imaging device for the respective reference area; and determining the reference height for each of the at least two reference areas based on the captured image.

In one form, the determining of the headlamp position further includes calculating a headlamp offset based on the vehicle pitch and the headlamp height variation. The modified headlamp position is based on the headlamp offset and the standard headlamp position.

In another form, method further includes setting a position of an optical beam-setter based on the modified headlamp position; receiving, by the optical beam setter, a light beam from the headlamp; generating, by the optical beam setter, aiming data; and adjusting, by an aim adjustment device, an aim of the headlamp based on the aiming data.

In one form, the present disclosure is directed toward a headlamp aiming system for aiming a headlamp of a vehicle. The system includes a height measurement instrument and a headlamp position calculator. The height measurement instrument is disposed external of the vehicle and is operable to measure two or more reference heights at two or more reference areas along a body of the vehicle. The two or more reference areas include an area at a front portion of the vehicle and at a rear portion of the vehicle, and one of the reference heights is indicative of a height of a headlamp of the vehicle. The headlamp position calculator is configured to determine a modified headlamp position based on a pitch of the vehicle, a headlamp height variation, and a standard headlamp position. The headlamp position calculator determines the pitch and the headlamp height variation based on the two or more reference heights.

In another form, the headlamp position calculator is configured to calculate a headlamp offset based on the pitch and the headlamp height variation, and to determine the modified headlamp position using the headlamp offset.

In yet another form, the height measurement instrument is configured to measure the reference heights of a front wheel fender and a rear wheel fender of the vehicle. The headlamp position calculator is configured to calculate the pitch based on the heights of the front wheel fender and the rear wheel fender.

In one form, the height measurement instrument includes one or more digital cameras that capture an image including the reference area.

In another form, the height measurement instrument includes a first digital camera that is arranged to measure a height of a front driver reference area; a second digital camera that is arranged to measure a height of a front passenger reference area; a third digital camera that is arranged to measure a height of a rear driver reference area; and a fourth digital camera that is arranged to measure a height of a rear passenger reference area.

In yet another form, the headlamp position calculator is configured to calculate an average front vehicle height based on the heights of the front driver reference area and the front passenger reference area, to calculate an average rear vehicle height based on the heights of the rear driver reference area and a rear passenger reference area, and to calculate the pitch based on the average front vehicle height and the average rear vehicle height.

In one form, the headlamp aiming system further includes an optical beam-setter and an aim adjustment device. The optical beam-setter has an adjustable height and is operable to receive a light beam. The optical beam setter is adjusted to the modified headlamp position and is operable to output aiming data based on the light beam. The aim adjustment device includes a tool for adjusting the aim of the headlamp based on the aiming data.

In one form, the present disclosure is directed toward a vehicle headlamp aiming method. The method includes measuring, by a measurement instrument positioned external of the vehicle, a front fender height and a rear fender height; calculating a modified headlamp position based on a standard headlamp height, a vehicle pitch, and a headlamp height variation, where the pitch and the headlamp height variation are determined based on the front and rear fender heights; and aiming a vehicle headlamp using the modified headlamp position as a headlamp height.

In another form, the measuring the front fender height and the rear fender height further includes: capturing an image of a front fender and of a rear fender of the vehicle; and determining the front fender height and the rear fender height based on the captured images.

In yet another form, the method includes: calculating the headlamp height variation based on the measured front fender height and a standard fender height; calculating the vehicle pitch based on the measured front fender height and rear fender height; and determining a headlamp offset based on the vehicle pitch and the headlamp height variation, where the modified headlamp position is based on the headlamp offset and the standard headlamp position.

In one form, the method further includes setting a position of an optical beam-setter based on the modified headlamp position; receiving, by the optical beam setter, a light beam from the headlamp; generating, by the optical beam setter, aiming data; and adjusting, by an aim adjustment device, an aim of the headlamp based on the aiming data.

In another form, the method further includes calculating the headlamp height variation as a difference between a standard fender height and the measured front fender height.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
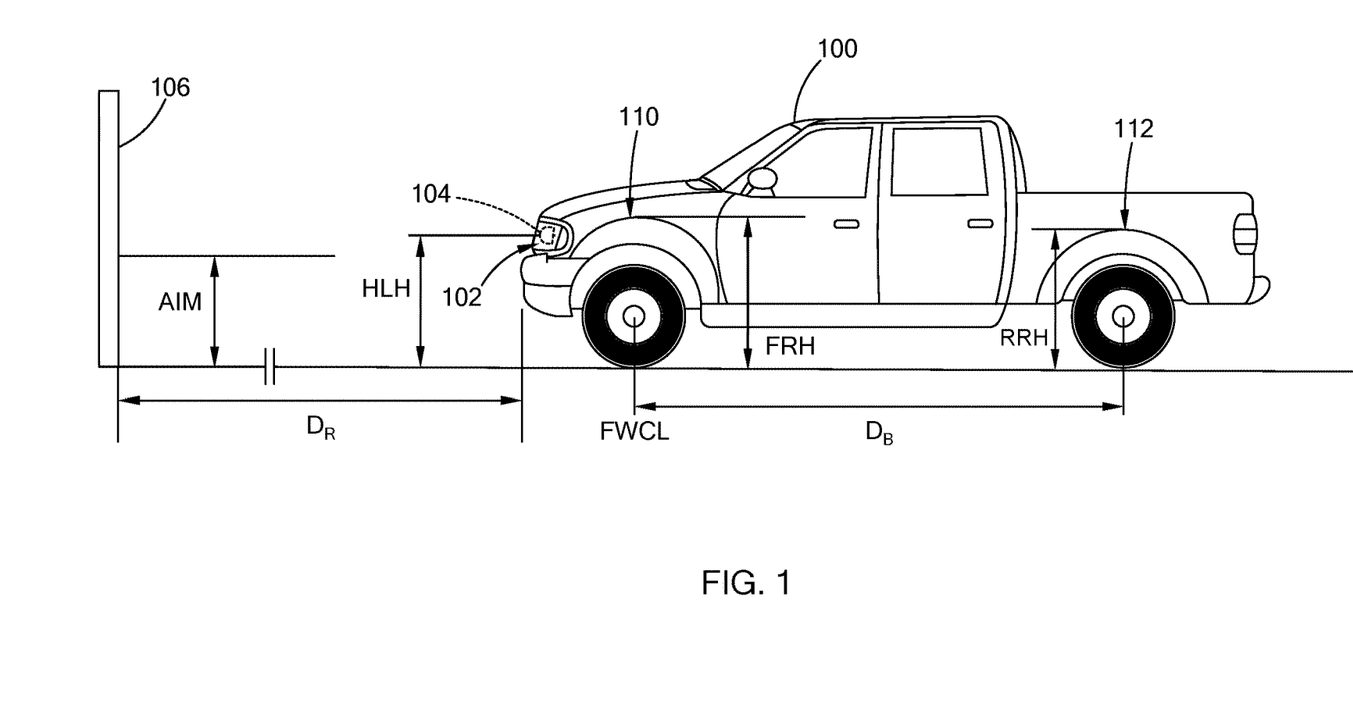
FIG. 1. Illustrates a vehicle positioned a set distance from a reference wall for a headlamp aim evaluation.

Referring to FIG. 1 a vehicle 100 includes one or more headlamps 102 disposed along a front portion of the vehicle 100. Among other factors, the aim of a headlamp 102 is influenced by the position of a bulb 104 within the headlamp 102 and an aim height (AIM) of the headlamp 102. The aim height is measured at a regulatory set distance (DR), such as 25 ft, and is measured from the front of the vehicle 100 to a reference wall 106. For brevity, the position of headlamp 102 refers to the position of the bulb 104 within the headlamp 102 and includes a headlamp height (HLH). The headlamp height is generally set to a standard height that is associated with the make and model of the vehicle, and the standard height is used to aim the headlamp 102. As such, vehicles of the same make and model are aimed in the same manner, without considering vehicle-to-vehicle variations, such as ride height and/or pitch attitude.

The present disclosure is directed toward a headlamp aiming system that factors manufacturing variations between vehicles when aiming the headlamp. More particularly, the headlamp aiming system calculates a headlamp height variation, a pitch of the subject vehicle, and determines a modified headlamp height based on the headlamp height variation and the pitch. Using the modified headlamp height, an optical beam-setter is arranged in front of the headlamp to generate aiming data, and an aim adjustment device (e.g., a tool) is used to adjust the aim of the headlamp. Accordingly, the headlamp aiming system accounts for variations in, for example, vehicle ride height and pitch to improve the aiming accuracy of the headlamp.

Figure 2:
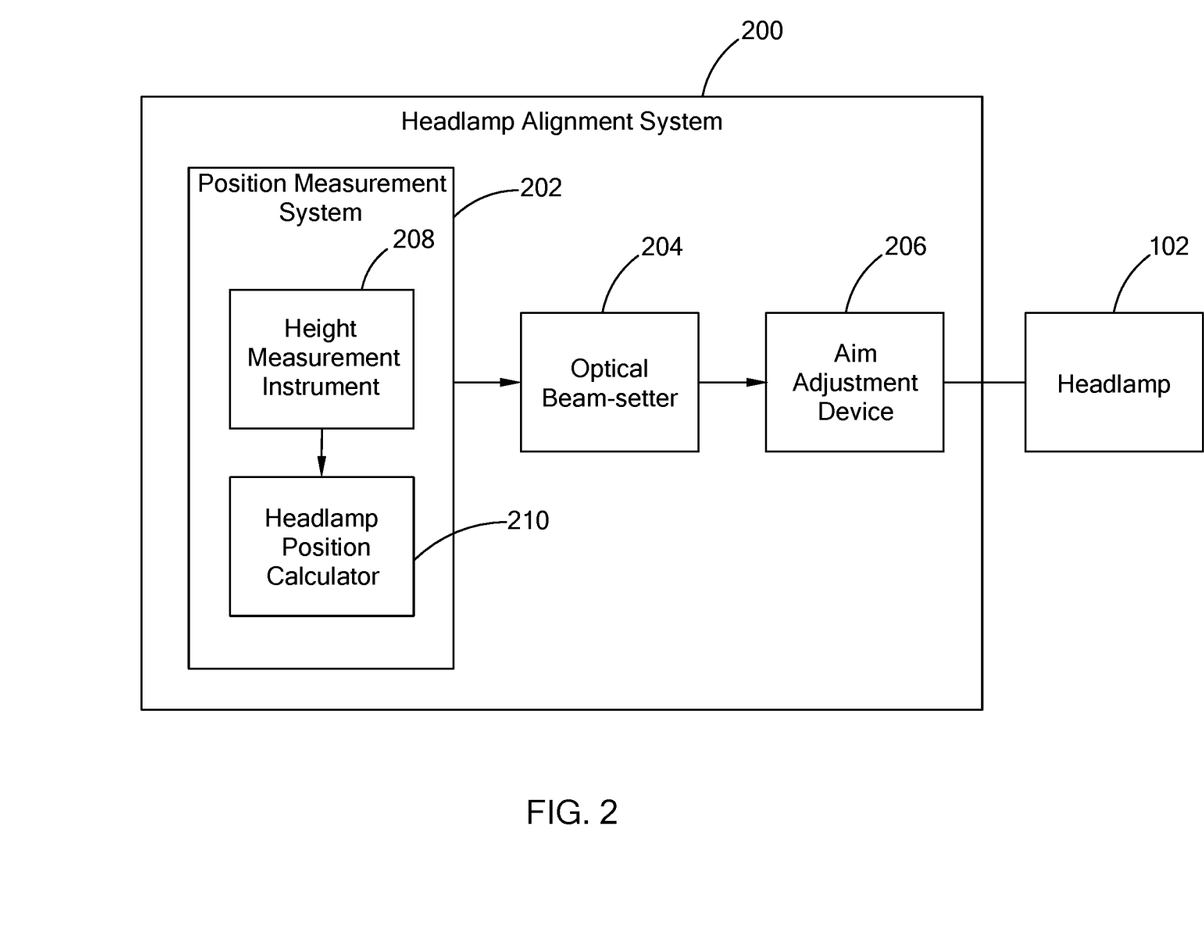
FIG. 2 is block diagram of a headlamp aiming system in accordance with the teachings of the present disclosure.

Referring to FIG. 2, a block diagram of a headlamp aiming system 200 is provided. In one form, the headlamp aiming system 200 includes a position measurement system 202, an optical beam-setter 204, and an aim adjustment device 206. The position measurement system 202 includes a height measurement instrument 208 for measuring at least two reference heights and a headlamp position calculator 210 for determining a position of the headlamp 102 based on the at least two reference heights.

The height measurement instrument 208 measures at least two reference heights of at least two reference areas along a body of the vehicle, where one of the at least two reference heights is indicative of a height of a headlamp of the vehicle. In one form, the instrument 208 measures a front reference height (FRH) at a front reference area along the body of the vehicle 100 and a rear reference height (RRH) at a rear reference area along the body of the vehicle. The front reference area is separated from the rear reference area by a base distance (DB). In one form, the front reference area and the rear reference area are set as a top portion of a front wheel fender and a rear wheel fender, respectively. The top portion of the front wheel fender and the top portion of the rear wheel fender are generally identified by reference numbers 110 and 112, respectively, and may be referred to as the front reference area 110 and the rear reference area 112 or collectively as reference areas 110 and 112.

The height measurement instrument 208 measures the reference heights needed by the system 200 to calculate the pitch and the headlamp height variations. More particularly, to determine a headlamp height variation, the system 200 measures the height of a front wheel fender and equates the measured height as the measured height of the headlamp. To determine the pitch of the vehicle, the system 200 measures a front reference area and a rear reference area along the same side of the vehicle. Accordingly, in one form, to minimize the number of measurements taken, the front reference area is set as the front wheel fender, so that the measurement can be used for both headlamp height variation and the pitch.

In one form, the height measurement instrument 208 is configured to measure a front reference height for both a driver side (e.g., left side) and a passenger side (e.g., right side) of the vehicle 100 to obtain two front reference heights. For example, the height measurement instrument 208 measures the height of the front reference area 110 on the driver side and on the passenger side. Similarly, the height measurement instrument 208 is configured to measure the heights of the rear reference areas 112 on the driver side and on the passenger side to obtain two rear reference heights.

Figure 3:
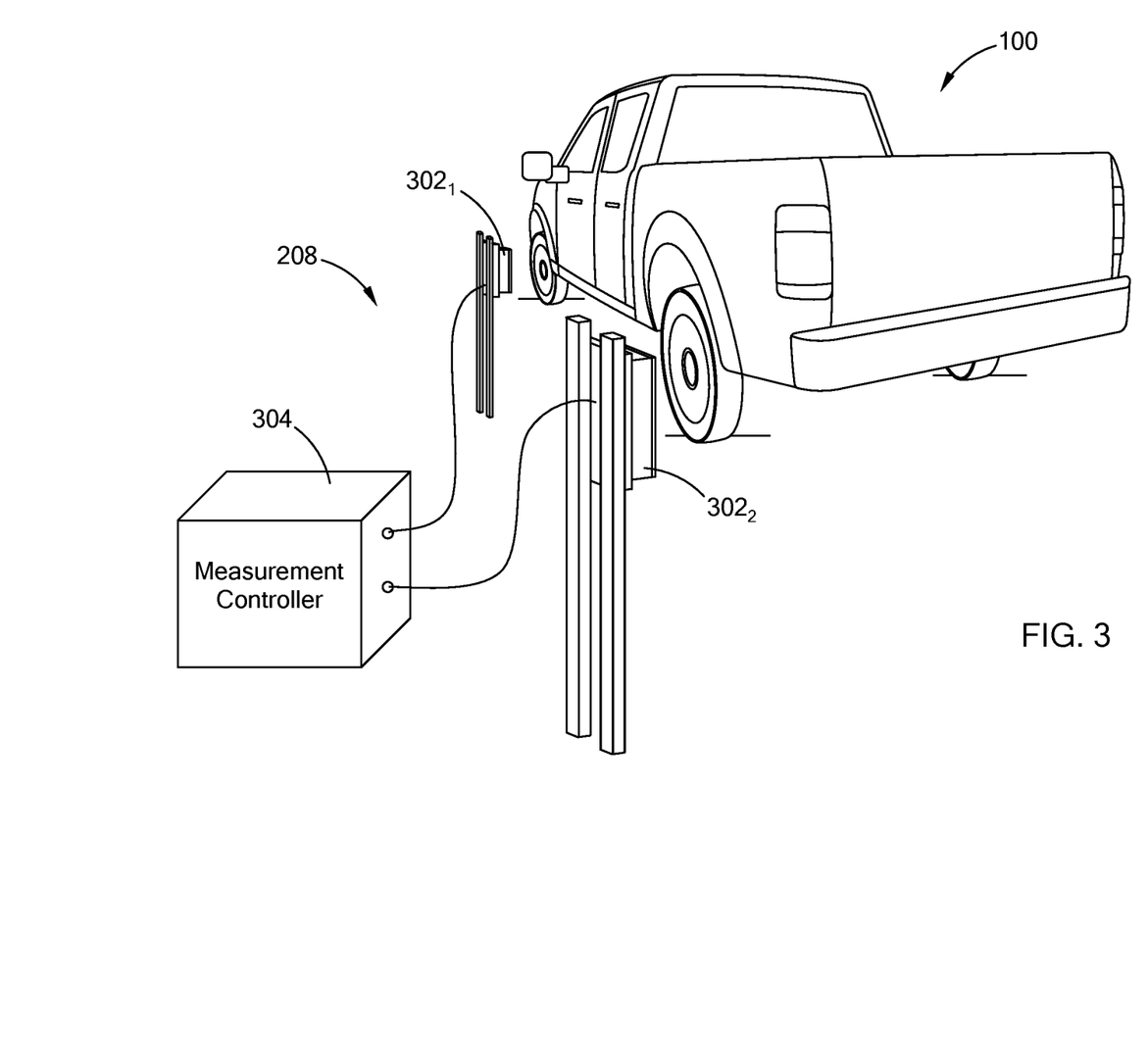
FIG. 3 illustrates a height measurement instrument in accordance with the teachings of the present disclosure.

Referring to FIG. 3, in one form, the height measurement instrument 208 includes one or more digital cameras 302 ($302_1$ and $302_2$ in figure) and a measurement controller 304 that is communicably coupled with each of the digital cameras 302 via wireless and/or wired communication. The digital cameras $302_1$ and $302_2$ are positioned outside of the vehicle 100 to capture an image that includes the front reference area 110 and the rear reference area 112, respectively. A similar configuration of digital cameras may be provided on the other side of the vehicle 100 for capturing an image of the other set of front and rear reference areas. The digital cameras may also be referred to as height gauges.

In one form, the measurement controller 304 is a type of computer and includes a processor, memory (e.g., ROM and/or RAM), and other electronic components. The memory stores computer readable instructions that are executable by the processor. The measurement controller 304 is configured to operate the digital cameras 302 and analyze the image to determine the reference heights based on the respective captured image. For example, the measurement controller 304 is calibrated to identify the ground as zero, and to associate a given pixel with specific unit of height (e.g., 1 pixel=2 mm). Based on the image and pre-stored picture recognition software, the measurement controller 304 determines the height based on the number of pixels between ground and the reference areas 110 and 112, which are identified using the picture recognition software. The measurement controller 304 may be configured in other suitable ways for determining the reference heights based on the captured image.

While the measurement controller 304 is illustrated as a separate component, each of the digital cameras may have a dedicated measurement controller that determines the height of the respective reference area based on the image captured. In such configuration, each of the dedicated measurement controllers outputs the height to the headlamp position calculator 210. Furthermore, while the height measurement instrument 208 is provided as including a digital camera for measuring the reference heights, other suitable measurement techniques that are provided outside of the vehicle may be used and are within the scope of the present disclosure. For example, a laser measurement instrument may also be used to measure the reference heights.

In one form, the headlamp position calculator 210 is a type of computer, and includes a processor, a memory (e.g., RAM/ROM), input/output interface, and other electronic components. The memory stores computer readable instructions that are executable by the processor. The headlamp position calculator 210 is configured to determine the modified headlamp position based on the reference heights. More particularly, using the front and rear reference heights, the headlamp position calculator 210 determines a pitch of the vehicle. For example, in one form, the headlamp position calculator 210 determines the pitch (P) using equation 1. The front reference height (FRH) and the rear reference height (RRH) are provided along the same side of the vehicle.

$$P = \tan^{-1}\left(\frac{(RRH - FRH)}{D_B}\right) \quad \text{Equation 1}$$

In another form, if the front reference height and the rear reference height for both sides of the vehicle 100 are measured by the height measurement instrument 208, the headlamp position calculator 210 determines an average front reference height ($FRH_{AVG}$) by taking the average of the front driver reference height and the front passenger reference height. Similarly, the headlamp position calculator 210 determines an average rear reference height ($RRH_{AVG}$) by taking the average of the two rear reference heights. The average front reference height and the average rear reference height are used in equation 1 as the front reference height and the rear reference height, respectively.

Using the measured height of the front fender as the measured height of the headlamp, the headlamp position calculator 210 calculates a headlamp height variation ($\Delta_{HH}$). For example, equation 2 defines the headlamp height variation using the measured height of the front fender ($FFH_M$) and a standard (e.g., nominal) height of the front fender ($FFH_S$), which is a predetermined value stored by the calculator 210. If the height of the front fender is measured for both passenger and driver sides of the vehicle, the calculator 210 may take an average of the two measurements and use the average measurement as $FFH_M$ in equation 2.

$$\Delta_{HH} = FFH_S - FFH_M \quad \text{Equation 2}$$

With the pitch and the headlamp height variation, the headlamp position calculator 210 calculates a headlamp offset ($\Delta_{HL}$) using, for example, equation 3 in which FWCL is a front wheel center line and HLB is a horizontal headlamp measurement. In one form, the horizontal headlamp measurement is the distance between the headlamp (i.e., the lamp) to a front axle centerline, and is a predetermined value stored by the calculator 210. Based on the headlamp offset, the headlamp calculator 210 determines the modified headlamp position ($HL_M$) using equation 4 in which $HL_S$ is the standard (i.e., nominal) headlamp height that is predetermined for the vehicle 100 and stored by the calculator 210.

$$\Delta_{HL} = -[(FWCL - HLB) \times \sin(P)] + \Delta_{HH} \quad \text{Equation 3}$$

$$HL_M = HL_S + \Delta_{HL} \quad \text{Equation 4}$$

The headlamp position calculator 210 may calculate the pitch, the headlamp height variation, and the headlamp offset using other suitable algorithms and inputs. Provided herein is just one example form of such calculation.

The optical beam-setter 204, which may also be referred to as a photometric aimer, is generally used in the industry for aiming a headlamp. Typically, the height of the optical beam-setter is adjustable and is set to align with the headlamp, such that the light beam from the headlamp shines into the optical beam-setter.

Figure 4:
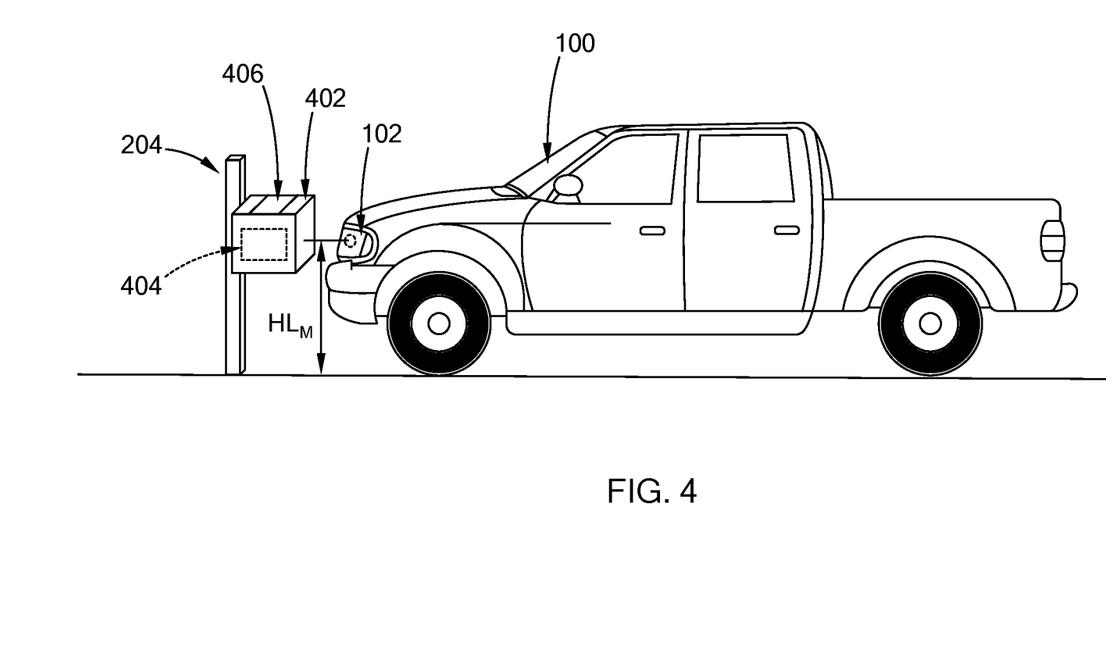
FIG. 4 illustrates an optical beam setter for aiming the headlamp in accordance with the teachings of the present disclosure.

Referring to FIG. 4, in one form, the optical beam-setter 204 is a conventional beam-setter and includes an aim box 402, a beam controller 404, and a display screen 406. The aim box 402 includes a lens (not shown) that receives the light beam from the headlamp 102. The beam controller 404 is a type of computer and is configured to analyze the light beam to generate aim data and display the aim data on the display screen 406.

Prior to analyzing the aim data, the optical beam-setter 204 is arranged in front a respective headlamp 102 that is to be aimed, and the height of the optical beam-setter 204 is set based on the modified headlamp position (i.e., modified headlamp height). In one form, the optical beam-setter 204 receives the modified headlamp position from the position measurement system 202 via a wireless or wired communication link, and the beam controller 404 is configured to adjust the height of the optical beam-setter 204 automatically. In another form, the position measurement system 202 displays the modified headlamp position on a display unit (not shown) viewable by the operator and the operator manually adjusts the position of the optical beam-setter 204. In addition to the height, the optical beam-setter 204 is positioned a set distance from the headlamp (e.g., 12-24 inches), which can be gauged by, for example, laser (not shown) disposed on the optical beam-setter 204.

The aim adjustment device 206 is operable to adjust the aim of the headlamp 102 based on the aim data generated by the optical beam-setter 204. In one form, the aim adjustment device 206 includes a tool that is operable by the operator and configured to engage with one or more adjuster mechanism (e.g., a fastener) (not shown) on the headlamp 102. For example, the tool is a screwdriver that interfaces with a head of the adjuster mechanism to rotate the adjuster mechanism on the headlamp 102. Alternatively, in lieu of the manual configuration, the aim adjustment device 206 may be an automated system that includes a robotic arm having a tool positioned at one end. The robotic arm is operable to drive the adjuster mechanism on the headlamp using the tool and adjust the aim based on the aiming data.

By determining a modified headlamp height for each vehicle, the headlamp aiming system of the present disclosure takes into account manufacturing variations. Accordingly, in lieu of using a standard height, a headlamp height is estimated for a subject vehicle and is used to provide a more accurate aim of the headlamp specific to the subject vehicle.

Figure 5:
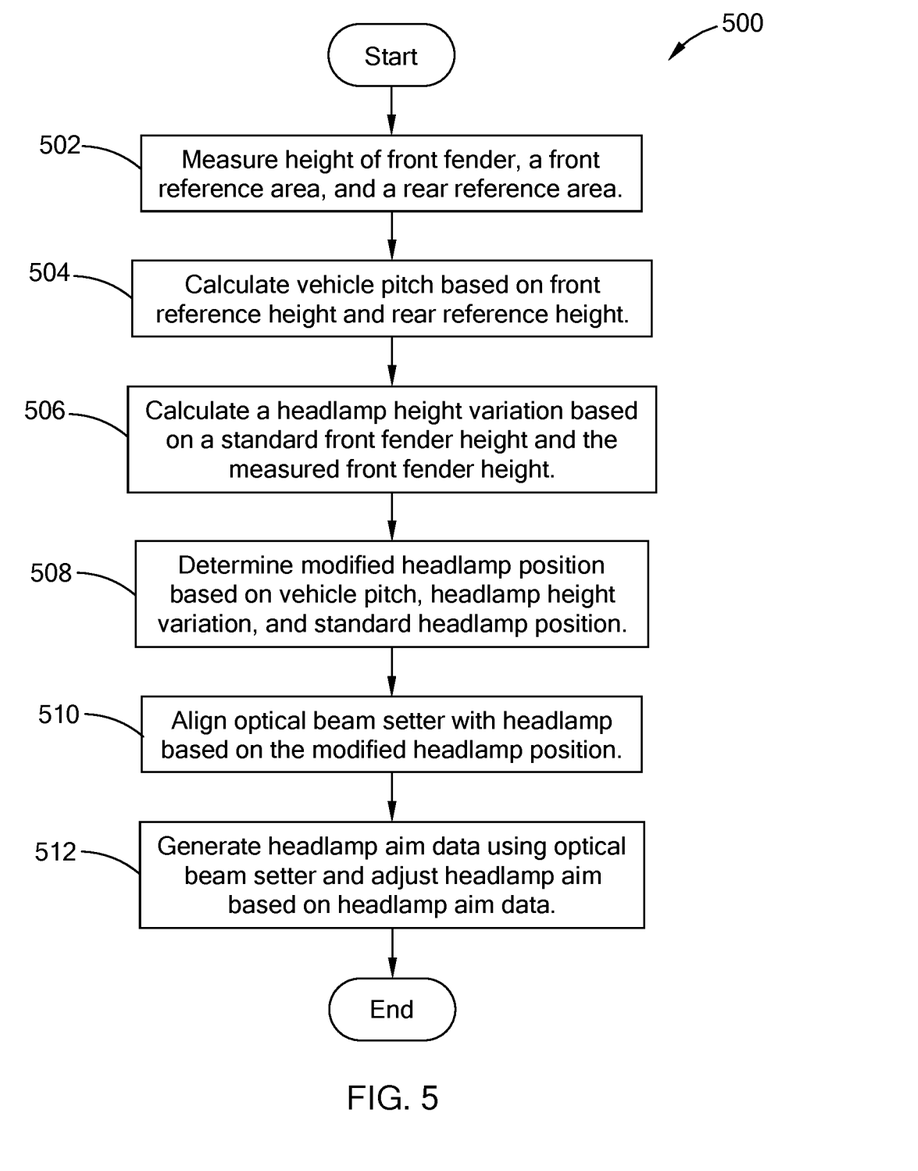
FIG. 5 is a flowchart of an example headlamp aiming routine in accordance with the teaching of the present disclosure.

Referring to FIG. 5, a headlamp aiming routine 500 performed by the system 200 is provided. Prior to executing the routine 500, a vehicle is aligned with the height measurement instrument, such as the digital cameras. At 502, the system measures the height of a front fender, a front reference area, and a rear reference area. In other words, measures at least two reference heights of at least two reference areas along a body of the vehicle, where one of the at least two reference heights is indicative of a height of a headlamp of the vehicle. The front reference height and the rear reference height, may be measured at reference areas on one side or both side of the vehicle. In one form, the height is measured from ground to the point of interest along the vehicle, such as the front fender. As provided above, the front reference area may be set as the front fender to reduce the number of measurements taken.

At 504, the system calculates a vehicle pitch based on the front reference height and the rear reference height using a stored algorithm, such as equation 1. At 506, the system calculates a headlamp height variation based on a standard front fender height and the measured front fender height, as provided in equation 2. That is, the height of the front fender is indicative of the height of the headlamp and thus, is used to determine possible variation in vehicle build height. At 508, the system determines the modified headlamp position or in other words, modified headlamp height, based on the vehicle pitch, the headlamp height variation, and the standard headlamp position. For example, the system determines a headlamp offset using equation 3, and then calculates the modified headlamp position based on the headlamp offset, as provided in equation 4.

At 510, the optical beam-setter is aligned with the headlamp based on the modified headlamp position, and is operated to generate headlamp aim data. At 512, the headlamp is adjusted based on the data from the optical beam-setter.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A headlamp aiming method for a vehicle, the method comprising:
   measuring, by a height measurement instrument, at least two reference heights of at least two reference areas along a body of the vehicle, wherein the height measurement instrument is disposed external of the vehicle, and one of the at least two reference heights is indicative of a height of a headlamp of the vehicle;
   determining, by a position measurement system, a vehicle pitch and a headlamp height variation of the vehicle based on the measured reference heights;
   calculating, by a position measurement system, a modified headlamp position based on the vehicle pitch, the headlamp height variation, and a standard headlamp position; and
   aiming a headlamp of the vehicle based on the modified headlamp position.

2. The headlamp aiming method of claim 1, wherein the at least two reference heights include a front reference height and a rear reference height separated from the front reference height by a base distance.

3. The headlamp aiming method of claim 2, wherein the front reference height is taken at a front wheel fender and the rear reference height is taken at a rear wheel fender, and the height of the front wheel fender is provided as a reference height indicative of the height of the headlamp of the vehicle.

4. The headlamp aiming method of claim 1, wherein the at least two reference heights include a front driver height, a front passenger height, a rear driver height, and a rear passenger height.

5. The headlamp aiming method of claim 4, wherein the determining the vehicle pitch further comprises:
   calculating an average front vehicle height based on the front driver height and the front passenger height; and
   calculating an average rear vehicle height based on the rear driver height and the rear passenger height, wherein the pitch is determined based on the average front vehicle height and the average rear vehicle height.

6. The headlamp aiming method of claim 1, wherein the measuring of the at least two reference heights further comprises capturing an image of the at least two reference areas by a dedicated imaging device for the respective reference area, and determining the reference height for each of the at least two reference areas based on the captured image.

7. The headlamp aiming method of claim 1, wherein the determining the headlamp position further comprises calculating a headlamp offset based on the vehicle pitch and the headlamp height variation, wherein the modified headlamp position is based on the headlamp offset and the standard headlamp position.

8. The headlamp aiming method of claim 1 further comprising:
   setting a position of an optical beam-setter based on the modified headlamp position;
   receiving, by the optical beam setter, a light beam from the headlamp;
   generating, by the optical beam setter, aiming data; and
   adjusting, by an aim adjustment device, an aim of the headlamp based on the aiming data.

9. A headlamp aiming system for aiming a headlamp of a vehicle, the system comprising:
   a height measurement instrument disposed external of the vehicle and operable to measure two or more reference heights at two or more reference areas along a body of the vehicle, wherein the two or more reference areas include an area at a front portion of the vehicle and at a rear portion of the vehicle, and one of the reference heights is indicative of a height of a headlamp of the vehicle; and
   a headlamp position calculator configured to determine a modified headlamp position based on a pitch of the vehicle, a headlamp height variation, and a standard headlamp position, wherein the headlamp position calculator determines the pitch and the headlamp height variation based on the two or more reference heights.

10. The headlamp aiming system of claim 9, wherein the headlamp position calculator is configured to calculate a headlamp offset based on the pitch of the vehicle and the headlamp height variation, and to determine the modified headlamp position using the headlamp offset.

11. The headlamp aiming system of claim 9, wherein the height measurement instrument is configured to measure the reference heights of a front wheel fender and a rear wheel fender of the vehicle, and the headlamp position calculator is configured to calculate the pitch based on the heights of the front wheel fender and the rear wheel fender.

12. The headlamp aiming system of claim 9, wherein the height measurement instrument includes one or more digital cameras that capture an image including the reference area.

13. The headlamp aiming system of claim 9, wherein the height measurement instrument includes:
   a first digital camera that is arranged to measure a height of a front driver reference area;
   a second digital camera that is arranged to measure a height of a front passenger reference area;
   a third digital camera that is arranged to measure a height of a rear driver reference area; and
   a fourth digital camera that is arranged to measure a height of a rear passenger reference area.

14. The headlamp aiming system of claim 13, wherein the headlamp position calculator is configured to calculate an average front vehicle height based on the heights of the front driver reference area and the front passenger reference area, to calculate an average rear vehicle height based on the heights of the rear driver reference area and a rear passenger reference area, and to calculate the pitch based on the average front vehicle height and the average rear vehicle height.

15. The headlamp aiming system of claim 9 further comprising:
   an optical beam setter having an adjustable height and operable to receive a light beam, wherein the optical beam setter is adjusted to the modified headlamp position and outputs aiming data based on the light beam; and
   an aim adjustment device including a tool and being operable to adjust an aim of the headlamp based on the aiming data.

16. A vehicle headlamp aiming method comprising:
   measuring, by an instrument positioned external of a vehicle, a front fender height and a rear fender height;
   calculating a modified headlamp position based on a standard headlamp height, a vehicle pitch, and a headlamp height variation, wherein the pitch and the headlamp height variation are determined based on the front and rear fender heights; and
   aiming a headlamp using the modified headlamp position as a headlamp height.

17. The vehicle headlamp aiming method of claim 16, wherein the measuring the front fender height and the rear fender height further comprises:
   capturing an image of a front fender and of a rear fender of the vehicle, and determining the front fender height and the rear fender height based on the captured images.

18. The vehicle headlamp aiming method of claim 16 further comprising:
   calculating the headlamp height variation based on the measured front fender height and a standard fender height;
   calculating the vehicle pitch based on the measured front fender height and rear fender height; and
   determining a headlamp offset based on the vehicle pitch and the headlamp height variation, wherein the modified headlamp position is based on the headlamp offset and the standard headlamp position.

19. The vehicle headlamp aiming method of claim 16 further comprising:
   setting a position of an optical beam-setter based on the modified headlamp position;
   receiving, by the optical beam setter, a light beam from the headlamp;
   generating, by the optical beam setter, aiming data; and
   adjusting, by an aim adjustment device, an aim of the headlamp based on the aiming data.

20. The vehicle headlamp aiming method of claim 16 further comprising calculating the headlamp height variation as a difference between a standard fender height and the measured front fender height.

* * * * *